United States Patent [19]

McDaniel et al.

[11] 4,367,373

[45] Jan. 4, 1983

[54] TWO-AXIS ELECTROMECHANICAL CONTROLLER

[75] Inventors: Joe W. McDaniel, Dayton; Nilss M. Aume, Springfield, both of Ohio

[73] Assignee: The United States of America as represented by the Secretary of the Air Force, Washington, D.C.

[21] Appl. No.: 251,832

[22] Filed: Apr. 7, 1981

[51] Int. Cl.³ .................. G08C 21/00; G05G 9/00
[52] U.S. Cl. ........................ 178/18; 74/471 XY
[58] Field of Search ............ 178/18, 19; 74/471 R, 74/471 XY; 318/549

[56] References Cited

U.S. PATENT DOCUMENTS

| | | | |
|---|---|---|---|
| 2,929,258 | 3/1960 | Mackway | 74/471 |
| 3,095,754 | 7/1963 | Mayon et al. | 74/471 |
| 3,251,013 | 5/1966 | Klem et al. | 336/30 |
| 3,350,956 | 11/1967 | Monge | 74/471 |
| 3,409,252 | 11/1968 | Miller | 244/83 |
| 3,550,466 | 12/1970 | Ham | 74/471 |
| 3,832,895 | 9/1974 | Strandh | 73/133 R |
| 3,864,515 | 2/1975 | Fee, Jr. | 178/18 |
| 3,940,674 | 2/1976 | Gill | 318/589 |
| 4,091,234 | 5/1978 | Bristow | 178/18 |

*Primary Examiner*—Thomas A. Robinson
*Attorney, Agent, or Firm*—Donald J. Singer; Bobby D. Scearce

[57] ABSTRACT

An improved two-axis electromechanical controller for controlling a dynamic process is described herein and comprises a hand grip coupled to two gimbal elements having mutually perpendicular axes of rotation, adjustable spring centering means mounted eccentric to the said axes of rotation and an adjustable counterweight for resisting displacement forces on the grip and restoring the grip to a reference position when a displacement force is removed, and electrical transducers for sensing the angular positions of each gimbal element. The force versus displacement relationship of the controller of the described invention is smooth and monotone, and may be adjusted to be substantially linear.

3 Claims, 2 Drawing Figures

TWO-AXIS ELECTROMECHANICAL CONTROLLER

RIGHTS OF THE GOVERNMENT

The invention described herein may be manufactured and used by or for the Government of the United States for all governmental purposes without the payment of any royalty.

BACKGROUND OF THE INVENTION

This invention relates generally to control mechanisms operable about two or more mutually perpendicular axes for mechanically or electrically transmitting commands for movement in two or more directions. More specifically, this invention relates to an electromechanical hand controller comprising two gimbal elements mounted on shafts having mutually perpendicular axes of rotation, each shaft being suitably interconnected to means for generating electrical signals, corresponding to movement of the shafts about their respective axes of rotation, for controlling some dynamic process, such as aircraft flight, air refueling boom control, radar tracking operations, and the like.

Prior art electro-mechanical controllers suffer certain disadvantages limiting their effectiveness for use such as in aircraft control, because of their vibration sensitivity, high hysteresis characteristics and inaccurate and erratic operation near the center (or null) position, relatively large displacement required to provide a suitable signal, and lack of suitability for miniaturization to accommodate the space and weight requirements within an aircraft or the like. Additionally, conventional displacement type hand controllers require undesirably high breakout forces and exhibit high hysteresis and dead-band characteristics. These characteristics contribute to errors making such controllers relatively unsuitable for continuous tracking applications, such as radar tracking, aiming of weapons or sensors, and like processes.

The foregoing problems characteristic of prior art controllers have been eliminated or significantly reduced in critical importance by the invention described herein, providing an improved two-axis electromechanical hand controller for controlling a dynamic process, such as the flight of an aircraft. This invention comprises a control member in the form of a hand grip connected to two gimbal elements having mutually perpendicular axes of rotation, an adjustable spring centering configuration for the two gimbal elements and an adjustable counterweight for accurately restoring the grip to a predetermined reference (null) position when a displacement force is removed, and electrical transducers for sensing the angular positions of the two gimbal elements and transmitting the appropriate signal to the process being controlled.

Accordingly, it is an object of this invention to provide an improved two-axis electromechanical controller.

It is a further object of this invention to provide an improved two-axis electromechanical controller having an adjustable spring centering means and adjustable counterweight for accurately and reliably returning the controller to the null position when a displacement force is removed.

It is still a further object of this invention to provide an improved two-axis electromechanical controller having no breakout force, hysteresis or dead-band characteristics.

These and other objects of the invention will become apparent as the description thereof proceeds.

SUMMARY OF THE INVENTION

In accordance with the foregoing principles and objects of the herein described invention, an improved two-axis electromechanical controller for controlling a dynamic process is described herein and comprises a hand grip coupled to two gimbal elements having mutually perpendicular axes of rotation, adjustable spring centering means mounted eccentric to the said axes of rotation and an adjustable counterweight for resisting displacement forces on the grip and restoring the grip to a reference position when a displacement force is removed, and electrical transducers for sensing the angular positions of each gimbel element. The force versus displacement relationship of the controller of the described invention is smooth and monotone, and may be adjusted to be substantially linear.

DESCRIPTION OF THE DRAWINGS

The invention will be more clearly understood from the following detailed description of specific embodiments thereof read in conjunction with the accompanying drawings wherein.

DETAILED DESCRIPTION

Figure 1:
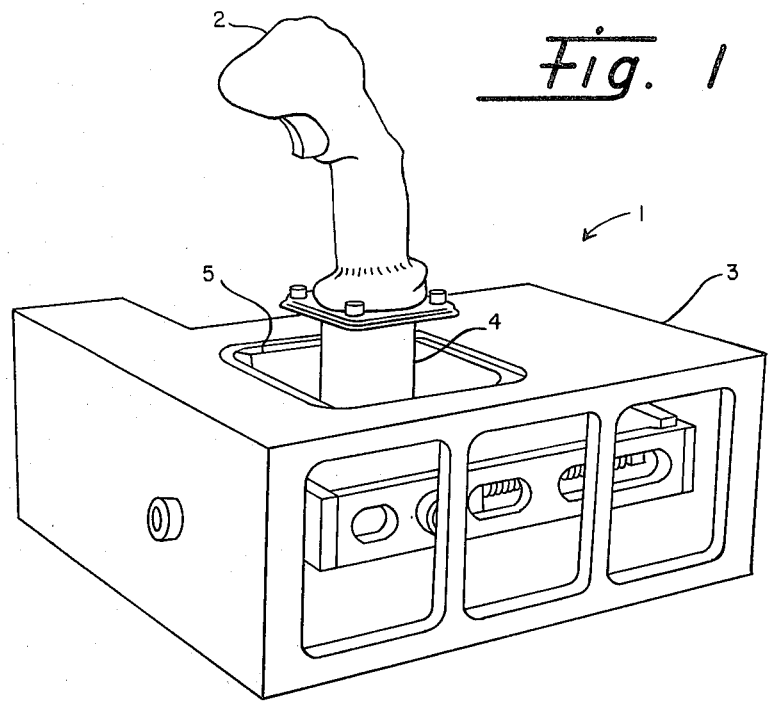
FIG. 1 is a perspective drawing of one embodiment of the present invention.
Figure 2:
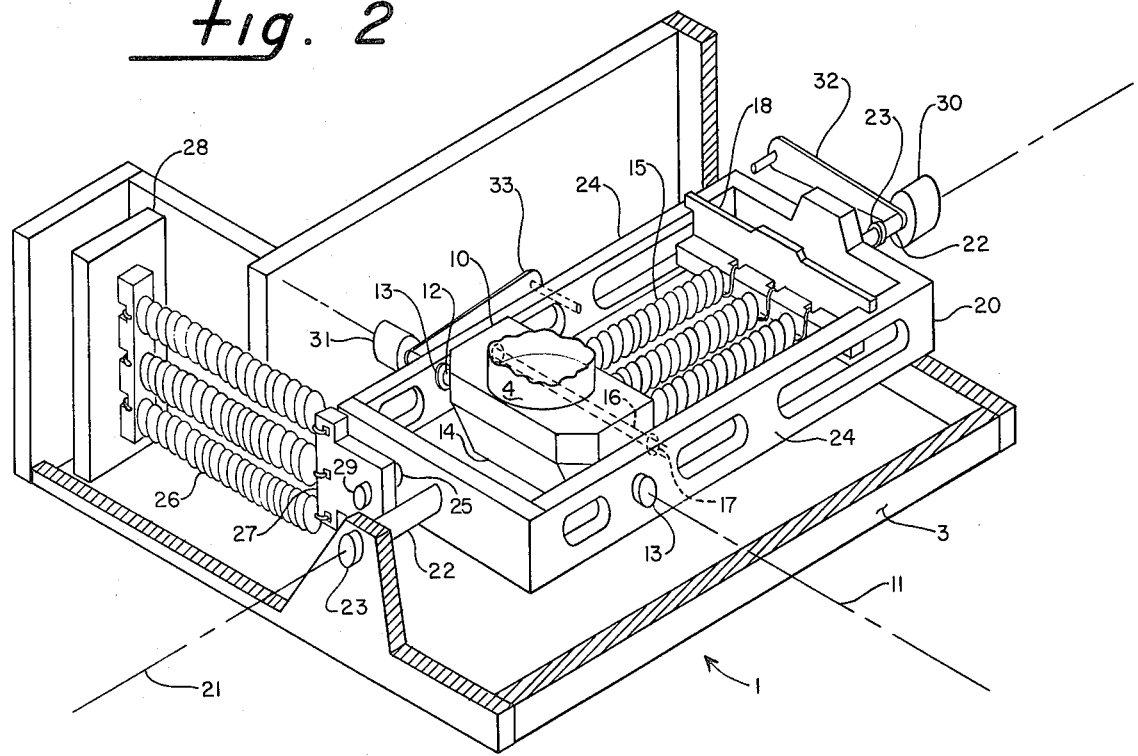
FIG. 2 is an isometric drawing of the embodiment of FIG. 1, shown with a substantial portion of the housing cut away to expose the elements of the invention.

Referring now to the drawings, FIG. 1 illustrates the controller 1 of this invention comprising a conventional control stick 2, and a housing 3 providing a support structure for the interior elements of controller 1 of this invention. Control stick 2 is connected through vertical extension element 4 to inner gimbal 10 as shown in FIG. 2. Housing 3 has in the top surface thereof opening 5 of sufficient size to allow suitable lateral and longitudinal movement of control stick 2.

In FIG. 2, significant portions of the surfaces of housing 3, control stick 2, and vertical extension element 4 are shown in cutaway to expose the interior elements of the controller of this invention.

As shown in FIG. 2, the interior elements of controller 1 comprise a balanced rectangular outer gimbal 20 rotatable about axis 21 on shaft 22 journalled into and supported by housing 3 through precision ball bearing mounts 23. Inner gimbal 10 is rotatable about axis 11 on shaft 12 journalled into and supported by lateral elements 24 of outer gimbal 20 through precision ball bearing mounts 13. Inner gimbal 10 is supported within outer gimbal 20 in such manner that axis 11 is perpendicular to, although does not necessarily intersect, axis 21. Downwardly extending portion of inner gimbal 10 comprises an adjustable counterweight 14 through which, with proper adjustment, the inner gimbal 10 may be balanced against the weight of hand grip 2 and vertical extension element 4. The balancing of inner gimbal 10 by means of adjustable counterweight 14 substantially eliminates the effects of extraneous acceleration forces on controller 1. In the embodiment constructed, counterweight 14 comprised a downwardly extending threaded shaft (not shown) attached to inner gimbal 10 for receiving a threaded counterweight.

Inner gimbal 10 is centered within outer gimbal 20 by means of one or more centering springs 15 through which inner gimbal 10 may be biased to the null position against the tension of springs 15. Springs 15 are attached at one end thereof to a rotatable shaft 16 (shown hidden) in inner gimbal 10, shaft 16 being journalled at each end thereof into inner gimbal 10 through precision ball bearing mounts 17 (also shown hidden). Springs 15 are rigidly attached to prevent slippage thereof on the surface of shaft 16. Shaft 16 has an axis of rotation parallel to axis 11 in a plane perpendicular to the centerline of control stick 2 and element 4. In the embodiment shown in FIG. 2, shaft 16 is spaced eccentric to axis 11 by approximately one inch, which spacing, though not critical, proved satisfactory for the assembly shown. Springs 15 are rigidly attached at the other ends thereof to spring attaching plate 18 such that the tensioning force of springs 15 and the axis of rotation of shaft 16 and axis 11 lie in the same plane in the null position of inner gimbal 10. Plate 18 is in turn adjustably secured at each end thereof to the lateral elements 24 of outer gimbal 20. Plate 18 may be adjusted to a convenient position within outer gimbal 20 to suitably tension springs 15, and then secured into position by conventional means (not shown) such as clamps or set screws. More than one spring 15, though not critical to the invention herein, may be required to achieve a desired force-displacement relationship and a failsafe configuration for inner gimbal 10.

Outer gimbal 20 has at one end of its frame a pin 25 located eccentrically a convenient distance from shaft 22. In the configuration shown in FIG. 2, a spacing between pin 25 and shaft 22 of one inch, approximately the same spacing between shaft 16 and axis 11 of inner gimbal 10, was satisfactory to provide a desired spring attaching radius for each gimbal.

Centering springs 26 for outer gimbal 20 are rigidly attached at one end to mounting plate 27 and rigidly attached at the other end to adjustable tensioning plate 28. Rigid attachment of each end of springs 26 is desired to prevent slippage. Mounting plate 27 is journalled to pin 25 through precision ball bearing mount 29. Tensioning plate 28 is adjustably secured to the wall structure of housing 3 by any convenient means (not shown) and may be adjusted to a convenient position to suitably tension centering springs 26. In the configuration shown in FIG. 2, it is desirable for the tensioning forces of centering springs 26 to be in a plane perpendicular to axis 21 of rotation of outer gimbal 20. Further, more than one centering spring 26, may be desired to achieve a desired force-displacement relationship and fail-safe configuration for outer gimbal 20.

The configuration of FIG. 2 shows centering springs 26 and pin 25 positioned to one side of shaft 22. This configuration is not critical to the operation of the controller of this invention, and springs 26 and pin 25 may be otherwise positioned, as for example, below shaft 22, with appropriate changes to housing 3 to accommodate such alternate position. Further, it may be desirable to provide counterweights (not shown) on outer gimbel 20 to dynamically balance outer gimbal 20, against any variations in tensioning forces of springs 26.

Shaft 22 of outer gimbal 20 terminates at one end within transducer 30, and, similarly, shaft 12 of inner gimbal 10 terminates within transducer 31. In the configuration shown, transducers 30 and 31 are rotary variable differential transformers, which provide an electrical output signal proportional to the angular displacement of, respectively, shafts 22 and 12. Any conventional transducer suitable for the function thereof just described may be used, but rotary variable differential transformers may be preferred in most applications of this invention because they have low internal friction and exhibit substantially no output variation due to age and wear. Alternatively, optical transducers could be used, these also being low friction devices with no backlash. Resistive potentiometers could be used where centering accuracy is not critical as they exhibit higher internal friction and some backlash.

Spring steel mounts 32 and 33 respectively maintain the housing of transducer 30 fixed relative to housing 3 and the housing of transducer 31 fixed relative to lateral element 24 of outer gimbal 20. Mounts 32 and 33 are flexible to accomodate any misalignment of shafts 22 and 12 and to eliminate any backlash or hysteresis resulting from any such misalignment.

In the assembled configuration as represented in FIG. 2, inner gimbal 10 is maintained in a center (or null) position by centering springs 15 which have been tensioned through suitable adjusting and securing of attaching plate 18. Outer gimbal 20 is centered by springs 26 which have been tensioned by suitable adjustment of tensioning plate 28. Longitudinal displacement of control stick 2 results in rotation of inner gimbal 10 about axis 11, causing shaft 16 to be rotated out of the plane originally containing axis 11, shaft 16 and springs 15. The springs 15 resiliently resist this displacement. A lateral displacement of control stick 2 results in rotation of outer gimbal 20 about axis 21, causing pin 25 to be displaced. Springs 26 resiliently resist this displacement. When the forces causing the said displacements are removed, outer gimbal 20 and inner gimbal 10 are restored to the center (or null) positions by the restoring forces of springs 26 and springs 15, respectively. In the embodiment constructed, it was found that with suitable adjustment of attaching plate 18 and tensioning plate 28, a substantially linear force versus displacement relationship for control stick 2 was obtained. Transducers 30 and 31 provide appropriate signals, consistent with the respective angular displacements of outer gimbal 20 and inner gimbal 10, to control a process. For example, the output of transducer 30 may control the positioning of ailerons of an aircraft, and the output of transducer 31 may control the positioning of the elevators of the aircraft. Other uses for the controller herein as might occur to one with skill in the art are foreseeable.

The invention described herein comprises an improved two-axis controller; however, it is understood that a third axis may be incorporated into the controller by providing a control stick rotatable about its own axis.

Further it is understood that the size, shape and materials of construction of the controller of this invention or of the component parts thereof may be varied, or the arrangement or the component parts may be altered within the scope of the appended claims, as might occur to one having skill in the field of this invention, and, therefore all embodiments contemplated hereunder have not been shown in complete detail. Other embodiments may be developed without departing from the spirit and scope of this invention.

We claim:

1. A two-axis controller which comprises:
   a. a gimbal mechanism including a first rotatable element intercoupled with a second rotatable element, with the axes of rotation of said first and second rotatable elements being mutually perpendicular;
b. a structure for rotatably supporting said first rotatable element, said first rotatable element rotatably supporting said second rotatable element;
c. a control member connected to said second rotatable element;
d. a first spring means, interconnecting said structure and said first rotatable element at a point eccentric to the axis of rotation thereof, for biasing said first rotatable element to a predetermined reference position;
e. a second spring means, interconnecting said first rotatable element and said second rotatable element at a point eccentric to the axis of rotation thereof, for biasing said second rotatable element to a predetermined reference position; and
f. means for adjustably tensioning said first spring means and said second spring means.

2. The two-axis controller as recited in claim 1 further comprising an adjustable counterweight attached to said second rotatable element for balancing said element against the weight of said control member.

3. The two-axis controller as recited in claim 1 or claim 2 further comprising means, connected to said first rotatable element, for sensing the rotational displacement of said first rotatable element and providing an electrical output signal proportional thereto, and means, connected to said second rotatable element, for sensing the rotational displacement of said second rotatable element and providing an electrical output signal proportional thereto.

* * * * *